Oct. 5, 1943.  H. A. HARRIMAN  2,330,884
BEVERAGE PACKAGE
Filed Sept. 25, 1941

INVENTOR.
Henry A. Harriman
BY Brown, Critchlow & Flick
his ATTORNEYS.

WITNESSES.
A B Wallace.
E. O. Johns

Patented Oct. 5, 1943

2,330,884

UNITED STATES PATENT OFFICE 2,330,884

BEVERAGE PACKAGE

Henry A. Harriman, Carnegie, Pa.

Application September 25, 1941, Serial No. 412,273

4 Claims. (Cl. 99—77.1)

This invention relates to a beverage package, and more particularly to a filtering bag or capsule containing dry beverage-making material.

One of the objections to tea balls, coffee balls and the like by which individual cups of a beverage are made is that the dry beverage material that is contained in the ball or capsule of filter cloth or paper is adversely affected by light, air and humidity. This is especially true of coffee. It likewise has been undesirable to mix powdered cream and sugar with the beverage material in a filter bag to flavor it or, rather, to modify or improve its flavor. When such a mixture in a filter bag is placed in a cup of hot water to make the desired beverage, the powdered cream and sugar, being mixed with the beverage material, do not always dissolve completely but sometimes produce a beverage which is not sweet enough or does not contain enough cream. Further, the coffee oil has deteriorating effect on the cream and sugar, lessening the potability of the drink.

It is among the objects of this invention to provide a filtering beverage package in which the beverage material is hermetically sealed, and in which flavoring material is separated from the beverage material so as to prevent the latter from adversely affecting the flavoring material and to assure dissolving of all the flavoring when the package is immersed in hot water.

These objects are attained by placing the beverage material in a filtering capsule and enclosing that capsule by a layer of dried flavoring material formed into a protective shell that is impervious to light and air.

Figure 1:
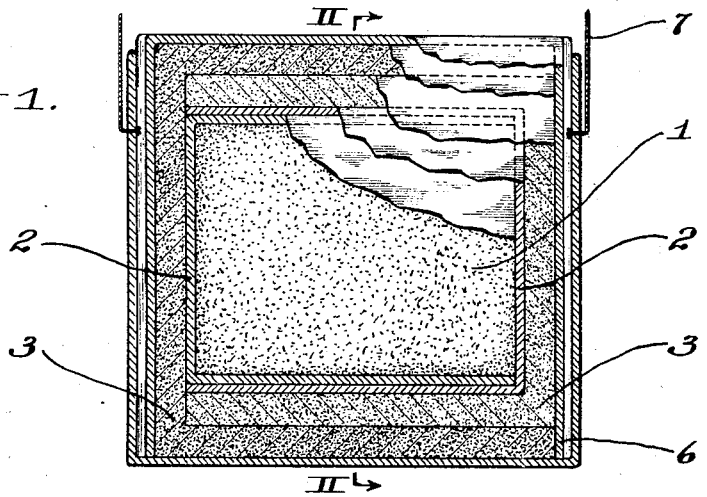
Figure 2:
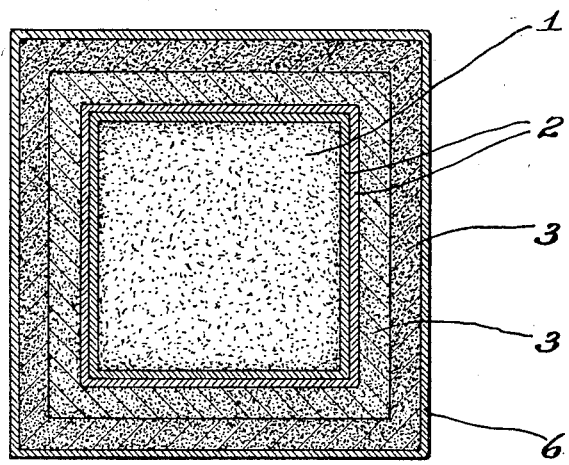
Figure 3:
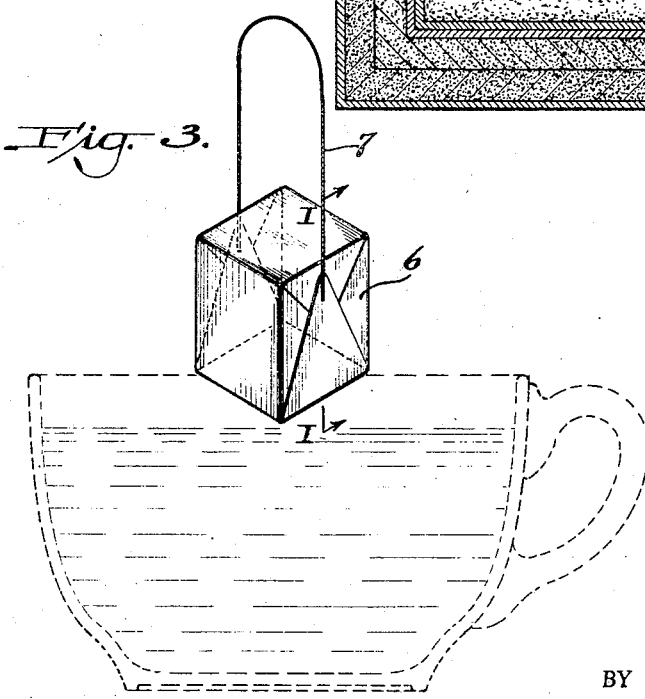

The invention is illustrated in the accompanying drawing in which Fig. 1 is a side view, partly in section, of my beverage package; Fig. 2 is a transverse section taken on the line II—II of Fig. 1; and Fig. 3 is a perspective view of a modified package.

Although this invention is applicable to tea, cocoa and the like, it is of especial importance in connection with coffee and therefore will be described accordingly merely for the purpose of illustration. Referring to the drawing, the powdered coffee 1, after being roasted and ground is placed in a capsule 2 of filter paper or cloth that is water permeable to permit the diffusion therefrom of all except the insoluble portions of the coffee grounds. After the roasting process it has been found advantageous to subject the coffee to known ultra-violet treatments in order to pasteurize it. For an individual or one-cup serving the capsule should hold about a tablespoon full of coffee. The coffee preferably should be ground somewhat finer than "drip grind," and yet the grains should retain their crystalloid form. If capsule 2 is made of filter paper, it preferably is formed in two cube-like halves the open ends of which are telescoped together to retain the coffee therein.

It is a feature of this invention that the coffee is hermetically sealed in capsule 2 by the flavoring material that constitutes part of my beverage package. Accordingly, capsule 2 is completely surrounded and enclosed by a shell 3 that is formed from the desired quantity of flavoring material, usually cream and sugar. The sugar may be either granulated or powdered and in an amount of about two teaspoonfuls. The cream is dried, a tablespoonful generally being deemed sufficient. The cream and sugar are each compressed in a mold of the desired shape to form a self-sustaining shell. Preferably, each is molded into the shape of a hollow cube open at one side with the two cubes formed for telescoping together in sealing engagement to produce the shell. Of course, the inside of the shell is large enough to receive capsule 2 which is placed in the shell before the two parts of the latter are telescoped together.

It is well known that light, air and moisture are detrimental to the flavor and aroma of coffee, but, in so far as I know, no effective hermetic seal has been devised heretofore for coffee balls. I have discovered that a layer or shell of dried cream and/or sugar around a ball of coffee is substantially impervious to light and air, so the coffee in my package is hermetically sealed by its enclosing shell of cream and sugar. A further advantage of the outer shell of cream and sugar is that it is separated from the coffee so that it can not be detrimentally affected by coffee oil, and it is in a position where it will be quickly and completely dissolved when immersed in hot water.

The hermetic seal formed as described above is very satisfactory, but to keep the package clean, give it a more finished appearance, render it more merchantable, and protect it against rough handling, the package should be wrapped in a sheet or bag of filter paper 6 which can be provided with a handling string 7, as shown in Fig. 3. A still more attractive package is formed if the wrapped package is dipped in warm syrup and egg white. This mixture dries quickly and leaves a polished outer surface which may contain coloring matter if desired.

Although coffee can be brewed in various ways by using my coffee ball or package, I have obtained the best results by placing the package in a cup and pouring about one-third of a cup of hot water over it and allowing it to stand for about five minutes. The cream and sugar are dissolved at once and the coffee gradually diffuses into the water. The cup is then filled with boiling water, following which the filter capsules can be removed. The cup is full of coffee containing sugar and cream and ready to be drunk.

Of course, some packages may be put up containing only coffee and cream, and other only coffee and sugar. The amount of cream and sugar may likewise be varied. Furthermore, the package may contain enough ingredients to make a whole pot full of coffee instead of just a cup full.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A beverage package comprising a filtering capsule filled with dry tea and enclosed by a self-form-sustaining shell formed of proper amounts of dry flavoring material to impart a desired flavor to the beverage, and a wrapping of filter material surrounding said shell.

2. A beverage package comprising a filtering capsule filled with dry cocoa and enclosed by a shell formed of dried cream and sugar, and a wrapping of filter material surrounding said shell.

3. A beverage package comprising a filtering capsule filled with dry coffee, a rigid self-sustaining shell enclosing the capsule and formed of two parts telescoped together in sealing engagement, one of said parts being formed of compressed sugar and the other part of compressed dried cream, a wrapping of filter material surrounding said shell, and a handling member attached to said wrapping.

4. A beverage package comprising a filtering capsule filled with dry beverage material, a rigid self-sustaining shell enclosing the capsule and formed of two parts telescoped together in sealing engagement, said parts being formed of compressed flavoring material, and a wrapping of filter material surrounding the shell.

HENRY A. HARRIMAN.